(12) United States Patent
You (10) Patent No.: US 12,171,347 B2
(45) Date of Patent: Dec. 24, 2024

(54) TUMBLER CAPABLE OF OUTPUTTING IMAGES

(71) Applicant: Jung Hyun You, Palisades, NJ (US)

(72) Inventor: Jung Hyun You, Palisades, NJ (US)

(*) Notice: Subject to any disclaimer, the term of this patent is extended or adjusted under 35 U.S.C. 154(b) by 0 days.

(21) Appl. No.: 18/376,887

(22) Filed: Oct. 5, 2023

(65) Prior Publication Data

US 2024/0023737 A1    Jan. 25, 2024

Related U.S. Application Data

(63) Continuation of application No. PCT/KR2022/004354, filed on Mar. 28, 2022.

(30) Foreign Application Priority Data

Apr. 8, 2021 (KR) ........................ 10-2021-0045808

(51) Int. Cl.
*A47G 19/22* (2006.01)
*G06F 3/14* (2006.01)

(52) U.S. Cl.
CPC ....... *A47G 19/2227* (2013.01); *G06F 3/1446* (2013.01); *A47G 2200/146* (2013.01)

(58) Field of Classification Search
CPC .......... A47G 19/2227; A47G 2200/146; G06F 3/1446
See application file for complete search history.

(56) References Cited

U.S. PATENT DOCUMENTS

| | | | |
|---|---|---|---|
| 2013/0103463 A1* | 4/2013 | Briar | G09F 23/06 340/815.4 |
| 2019/0357707 A1* | 11/2019 | Bugaj | A47G 19/2227 |
| 2020/0323370 A1* | 10/2020 | Connolly | A47G 19/2227 |

* cited by examiner

*Primary Examiner* — Peter D McLoone
(74) *Attorney, Agent, or Firm* — Dinsmore & Shohl LLP; Yongsok Choi, Esq.

(57) ABSTRACT

A tumbler capable of outputting images is provided. The tumbler includes a container part having an open upper part and an accommodation space for storing a beverage therein; a communication part installed in the container part and configured to receive image information from the outside; a transparent member which is installed in the container part to surround the circumference of the container part and is made of a transparent material transmitting light; an output part installed in the container part to surround the circumference of the container part between the transparent member and the container part, and configured to output at least one image included in the image information; and a battery part detachably installed in a lower part of the container part and supplying power to the output part.

8 Claims, 6 Drawing Sheets

TUMBLER CAPABLE OF OUTPUTTING IMAGES

CROSS-REFERENCE TO RELATED APPLICATIONS

This application is a continuation of International Application No. PCT/KR2022/004354 filed on Mar. 28, 2022, which claims priority to Korean Patent Application No. 10-2021-0045808 filed on Apr. 8, 2021, the entire contents of which are herein incorporated by reference.

TECHNICAL FIELD

The disclosure relates to a tumbler capable of outputting images, and more particularly, to a tumbler capable of outputting an advertising image, an entertainment image, etc., so as to give pleasure and generate profits

BACKGROUND ART

In recent years, as the problem of environmental pollution caused by the use of disposable products has emerged, various campaigns for reducing the use of disposable products have recently been carried out to protect nature and reduce waste emissions, and more and more individuals have been carrying tumblers to reduce the use of disposable products.

Tumblers are used to carry any drinkable liquids, and are in the spotlight as essential items not only for personal use when going out but also for outdoor activities such as hiking, fishing, trekking, and camping.

However, because conventional tumblers simply have a single function for liquid storage and portability, the conventional tumblers may not be used for purposes other than drinking.

SUMMARY

Technical Problem

An objective of the disclosure is to provide a tumbler capable of outputting image information provided from the outside.

Another objective of the disclosure is to provide a tumbler capable of outputting an advertising image, an entertainment image, etc. so as to generate profits or add pleasure Another objective of the disclosure is to provide a tumbler capable of outputting an advertising image so as to remit advertising costs and/or environmental improvement charges to users, thereby ultimately reducing environmental pollution and sharing profits which may raise a sense of community and build consensus and bonds among people in modern society.

Another objective of the disclosure is to provide a tumbler which may provide convenience and benefits to people in modern society by allowing the tumbler to be used in beverage delivery services beyond the simple use of holding a beverage.

However, the objectives of the disclosure are not limited thereto, and other unmentioned objectives will be apparent to one of ordinary skill in the art from the following description.

Technical Solution

A tumbler capable of outputting images according to the disclosure includes a container unit including an opening at a top and a receiving space therein in which a beverage is contained, a communication unit provided on the container unit and configured to receive image information from outside, a transparent member provided on the container unit to surround a circumference of the container unit, the transparent member being formed of a transparent material through which light is transmitted, an output unit located between the transparent member and the container unit and provided on the container unit to surround the circumference of the container unit, the output unit being configured to output at least one image included in the image information, and a battery unit detachably provided under the container unit and configured to supply power to the output unit.

Details of other embodiments are included in the detailed description and the accompanying drawings.

Advantageous Effects

According to embodiments of the disclosure, a tumbler of the disclosure may output an advertising image, an entertainment image, an identification code image, etc. Accordingly, profits from watching advertisements may be generated by outputting an advertising image, and pleasure may be provided to users by outputting an entertainment image such as a music video or a celebrity image. Also, a temperature of a beverage and a water level of a tumbler may be output to enable visual recognition of the temperature of the beverage and the amount of beverage remaining in the tumbler.

Also, when a user gets lost while hiking, a display of a tumbler may emit light and may function as a rescue lantern. Also, when sleeping, camping, etc., the display device of a tumbler may emit light with music and may function as a mood lamp.

Also, by outputting an image such as an advertising image on a tumbler of the disclosure, advertising costs and/or environmental improvement charges may be remitted to users, and thus, environmental pollution may be reduced and profits may be shared which may raise a sense of community and build consensus and bonds among people in modern society.

Also, convenience and benefits may be provided to people in modern society by allowing a tumbler of the disclosure to be used in beverage delivery services beyond the simple use of holding a beverage.

Effects of the disclosure are not limited thereto, and other unmentioned effects will be clearly understood by one of ordinary skill in the art from the appended claims.

DETAILED DESCRIPTION

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. In the specification, the same reference numerals denote the same elements.

The embodiments of the disclosure will be described with reference to cross-sectional views and/or plan views which are ideal exemplary views of the disclosure. In the drawings, thicknesses of regions are exaggerated for effective explanation of technical content. Therefore, regions illustrated in the drawings have schematic properties, and shapes of the regions illustrated in the drawings are illustrative of specific shapes of the regions of devices and are not intended to limit the scope of the disclosure. It will be understood that, although the terms first, second, etc. may be used in various embodiments of the disclosure to describe various elements, these elements should not be limited by these terms. These terms are used only for the purpose of distinguishing a certain element from the others. The exemplary embodiments described herein include embodiments complementary thereto.

The terms used herein are for the purpose of describing embodiments only and are not intended to limit the disclosure. As used herein, the singular forms "a," "an," and "the" are intended to include the plural forms as well, unless the context clearly indicates otherwise. It will be further understood that the terms "comprises" and/or "comprising" used herein specify the presence of stated elements, steps, operations, and/or devices, but do not preclude the presence or addition of one or more other elements, steps, operations, and/or devices.

Unless otherwise defined, all terms herein (including technical and scientific terms) have the same meaning as commonly understood by one of ordinary skill in the art to which the disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the concept of the disclosure and embodiments of the disclosure will be described in detail with reference to the drawings.

Figure 1:
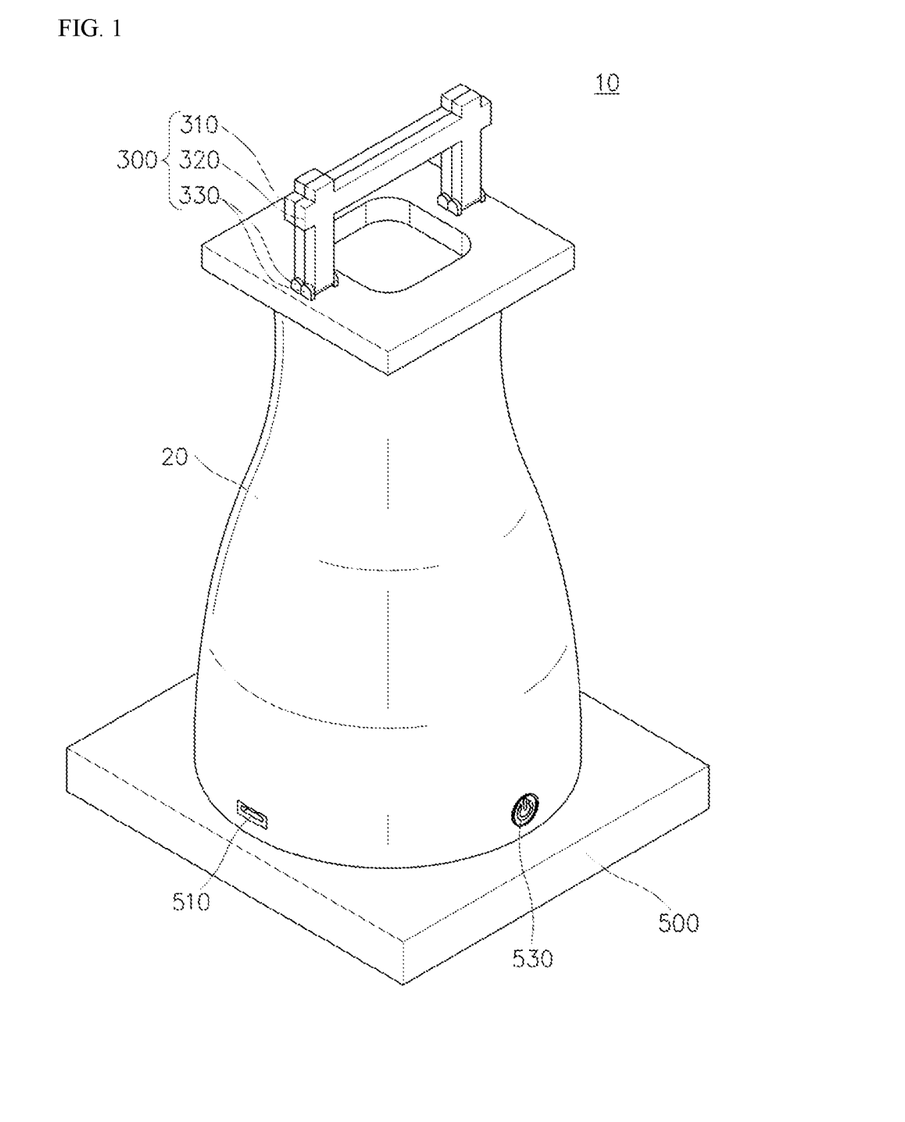
FIG. 1 is a perspective view illustrating a tumbler, according to an embodiment of the disclosure.
Figure 2:
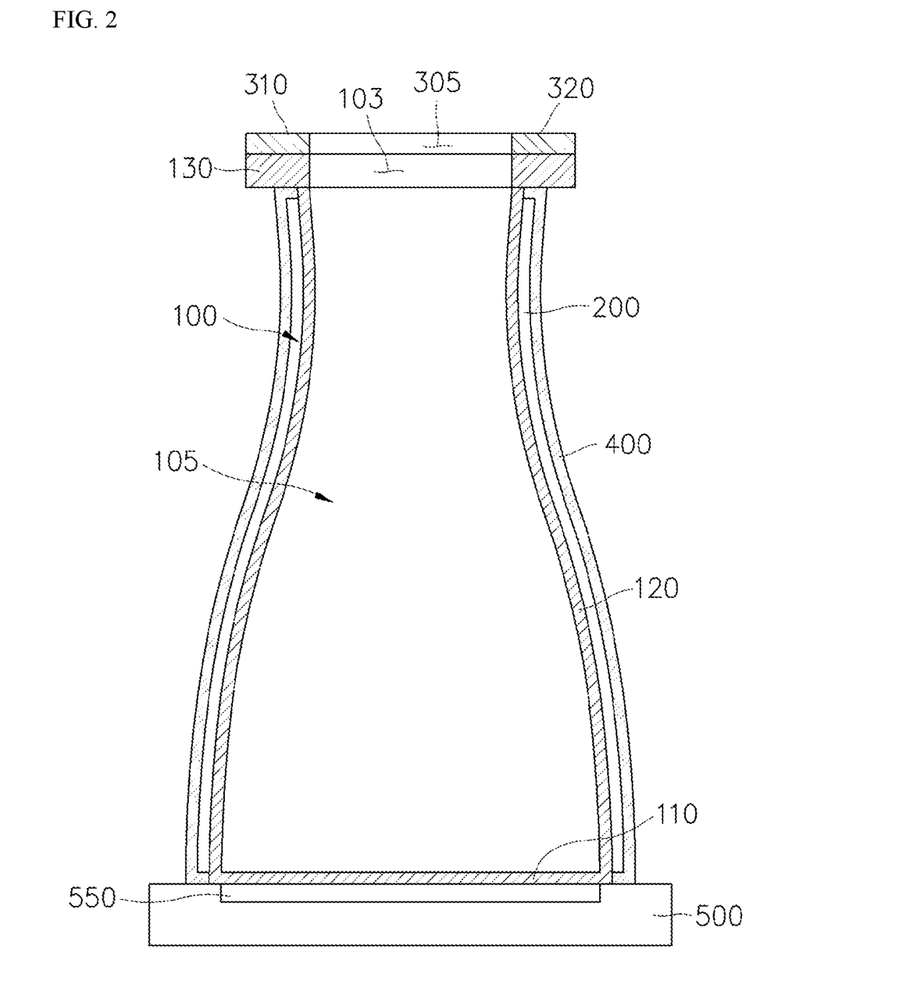
FIG. 2 is a cross-sectional view for describing the tumbler of FIG. 1.
Figure 3:
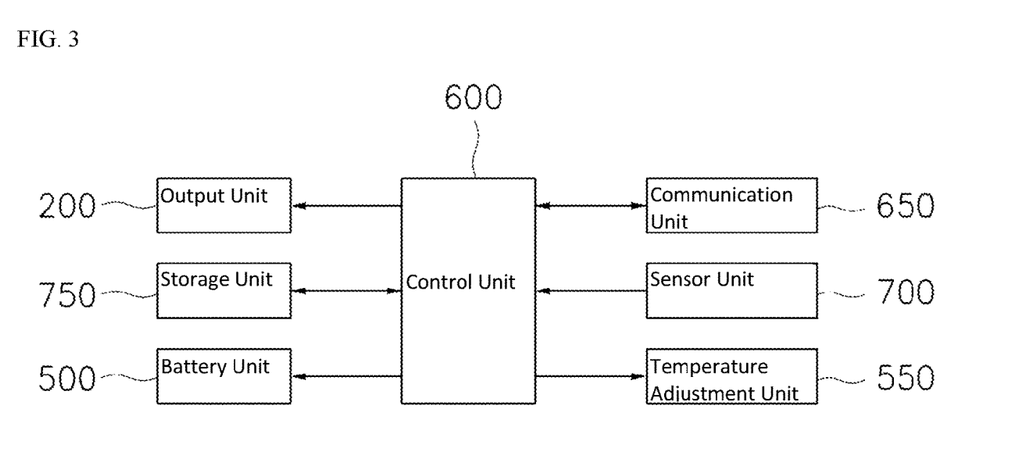
FIG. 3 is a block diagram for describing the tumbler of FIG. 1.

FIG. 1 is a perspective view illustrating a tumbler, according to an embodiment of the disclosure. FIG. 2 is a cross-sectional view for describing the tumbler of FIG. 1. FIG. 3 is a block diagram for describing the tumbler of FIG. 1.

Referring to FIGS. 1 to 3, a tumbler 10 according to an embodiment of the disclosure may generate advertising profits by outputting image information received through communication with the outside. The tumbler 10 may include a container unit 100, a transparent member 400, an output unit 200, a communication unit 650, and a battery unit 500. Also, the tumbler 10 may further include a handle unit 300, a sensor unit 700, a temperature control unit 550, a storage unit 750, and a control unit 600.

The container unit 100 may have an opening 103 at the top and a receiving space 105 therein in which a beverage is contained. In an embodiment, a shape of the container unit 100 may be, but is not limited to, a Cheomseongdae (stargazing tower) shape. The container unit 100 may be formed of stainless steel, plastic, or a ceramic material. The container unit 100 may include a bottom portion 110, a circumference portion 120, and a flange portion 130.

The bottom portion 110 may form the bottom of the container unit 100. In an embodiment, the bottom portion 110 may have a circular shape in a plan view, but the disclosure is not limited thereto and the bottom portion 110 may have any of various shapes. The bottom portion 110 may face the opening 103 of the container unit 100.

The circumference portion 120 may extend from a boundary of the bottom portion 110 toward the opening 103 of the container unit 100. Accordingly, the circumference portion 120 and the bottom portion 110 may surround the receiving space 105 of the container unit 100. In an embodiment, the circumference portion 120 may include an area whose width decreases from the bottom portion 110 toward the opening 103. Alternatively, in another embodiment, various modifications may be made. For example, a width of the circumference portion 120 may be constant or may increase upward.

The flange portion 130 may extend outward from an upper end of the circumference portion 120. In other words, the flange portion 130 may extend from an upper end of the circumference portion 120 in a direction away from the opening 103. In an embodiment, the flange portion 130 may have a quadrangular ring shape in a plan view, but the disclosure is not limited thereto and the flange portion 130 may have any of various ring shapes. The flange portion 130 may include a flow groove connected to the opening 103 and extending outward from the opening 103. The flow groove may be recessed downward from a top surface of the flange portion 130. Also, the flow groove may connect the opening 103 of the container unit 100 to an external space of the tumbler 10. Accordingly, a beverage may be easily introduced into a user's mouth through the opening 103 and the flow groove.

The handle unit 300 may be provided on the top of the container unit 100. The handle unit 300 may allow the user to hold the tumbler 10 by hand. In an embodiment, the handle unit 300 may be provided on the flange portion 130. The handle unit 300 may include a hinge portion 330, a first handle member 310, and a second handle member 320.

The hinge portion 330 may be provided on the top of the container unit 100. The first handle member 310 may have one end pivotably provided on the hinge portion 330. The second handle member 320 may be located symmetrical to the first handle member 310 with respect to the hinge portion 330. The second handle member 320 may have one end pivotably provided on the hinge portion 330.

Each of the first handle member 310 and the second handle member 320 may be formed in a substantially "⊏" shape in a plan view, but the disclosure is not limited thereto.

In an embodiment, the first handle member 310 may include a first support member located on the flange portion 130, a second support member located on the flange portion 130 and spaced apart from the first support member, and a first connection member connecting the first support member to the second support member. A first space connected to the opening 103 of the container unit 100 may be formed between the first support member and the second support member. One end of each of the first support member and the second support member may be connected to the hinge portion 330 and may pivot around the hinge portion 330. Also, the first connection member may connect the other end of the first support member to the other end of the second support member.

In an embodiment, the second handle member 320 may include a third support member located on the flange portion 130, a fourth support member located on the flange portion 130 and spaced apart from the third support member, and a second connection member connecting the third support member to the fourth support member.

A second space connected to the opening 103 of the container unit 100 may be formed between the third support member and the fourth support member. One end of each of the third support member and the fourth support member may be connected to the hinge portion 330 and may pivot around the hinge portion 330. Also, the second connection member may connect the other end of the third support member to the other end of the fourth support member.

The first support member and the third support member may be symmetrical to each other with respect to the hinge portion 330. The second support member and the fourth support member may be symmetrical to each other with respect to the hinge portion 330. The first connection member and the second connection member may be symmetrical to each other with respect to the hinge portion 330.

When the first handle member 310 and the second handle member 320 are located on the flange portion 130, the first space and the second space may be connected to each other to form a space 305 connected to the opening 103 of the container unit 100. Accordingly, through the space 305, a beverage may be poured into the opening 103 of the container unit 100 or a tumbler lid may be inserted to open and close the opening 103 of the container unit 100.

The tumbler lid may be used to open and close the opening 103 of the container unit 100. In an embodiment, the tumbler lid may include an insertion portion inserted into the opening 103 and a cover portion located on the insertion portion.

The insertion portion may include a beverage flow path passing therethrough. Accordingly, the insertion portion may be provided in a cylindrical shape that is open at the top and bottom. In an embodiment, a thread coupled to the tumbler may be formed on a circumferential surface of the insertion portion.

The cover portion may be provided on the insertion portion. The cover portion may cover an upper side of the beverage flow path. The cover portion may be located on the flange portion of the tumbler. The cover portion may be located inside the first handle member and the second handle member so as not to interfere with the rotation of the first handle member and the second handle member.

The cover portion may include a beverage hole passing therethrough. The beverage hole may be connected to the beverage flow path. In an embodiment, the beverage hole may vertically overlap the beverage flow path. The cover portion may include an opening/closing member for opening and closing the beverage hole. The opening/closing member may adjust a size of the beverage hole. For example, the opening/closing member may open only a part of the beverage hole when a temperature of a beverage is higher than a preset temperature. Accordingly, a small amount of the beverage accommodated in the container unit 100 may be discharged through the beverage hole, and injury to the user due to hot beverage intake may be minimized. Also, the opening/closing member may completely open the beverage hole when a temperature of a beverage is lower than a preset temperature.

The communication unit 650 may be provided on the container unit 100. In an embodiment, the communication unit 650 may be provided at the top of the container unit 100, but the disclosure is not limited thereto and the communication unit 650 may be provided at any of various positions of the container unit 100. The communication unit 650 may transmit data to the outside or may receive data from the outside. In an embodiment, examples of the data may include image information, audio information, a control signal, identification information, temperature information, and notification information. In an embodiment, the communication unit 650 may wirelessly communicate with a network of a mobile carrier, a Wi-Fi network of a workplace, or a mobile phone network of the user.

In an embodiment, the communication unit 650 may include a remote-distance network interface such as a 3G module, an LTE Module, a Wi-Fi module, or a LAN card. Alternatively, in another embodiment, the communication unit 650 may include various network interfaces such as a short-distance network interface such as a Bluetooth module, an NFC module, an RF module, or an infrared module, and other network interfaces.

The output unit 200 may be provided on the container unit 100 to surround a circumferential surface of the container unit 100. The output unit 200 may be located between the container unit 100 and the transparent member 400 provided outside the container unit 100. In an embodiment, the output unit 200 may be provided on the circumference portion 120 to entirely surround the circumference portion 120. Alternatively, in another embodiment, the output unit 200 may be provided on the circumference portion 120 to cover a part of the circumference portion 120.

The output unit 200 may output at least one image included in image information received through the communication unit 650. In an embodiment, the output unit 200 may output one image included in the image information. Alternatively, in another embodiment, the output unit 200 may simultaneously, sequentially, regularly, or irregularly output a plurality of images included in the image information.

The image information may include an advertising image, an identification code image, an entertainment image obtained by the user, and other information images. In an embodiment, examples of the advertising image may be an image for promoting a company's product, an image for promoting a government policy, and an image for promoting a public service project. Examples of the code image may include a bar code image and a QR code image. Also, examples of the entertainment image may include a movie image, a person image, and a character image.

The output unit 200 may be a display such as a liquid crystal display (LCD), a light-emitting diode (LED), an organic light-emitting diode (OLEIC), or a plasma display panel (PDP). Also, the output unit 200 may be a curved display or a flexible display. Also, the output unit 200 may be a surface sound display. Accordingly, the output unit 200 may output an audio corresponding to audio information. Alternatively, in another embodiment, the tumbler 10 may include a separate audio unit such as a speaker, and may output an audio through the separate audio unit. The audio unit may be provided on the lid of the tumbler, or may be provided on another element.

In an embodiment, the output unit 200 may include a transparent solar panel layer (not shown). Accordingly, the output unit 200 may produce power while outputting an image. The power produced by the output unit 200 may be stored in the battery unit 500. Alternatively, in another embodiment, the transparent solar panel layer may be provided on the transparent member 400.

The transparent member 400 may be provided on the container unit 100 while surrounding the circumferential surface of the container unit 100. In an embodiment, the transparent member 400 may be provided on the circumference portion 120 while covering the circumference portion 120 of the container unit 100. Accordingly, the transparent member 400 may cover the output unit 200 provided on the circumferential surface of the container unit 100. Because the transparent member 400 covers the output unit 200, the output unit 200 may be protected from an external foreign material, etc.

The transparent member 400 may be formed of a transparent material through which light is transmitted. In an embodiment, although the transparent member 400 is formed of a transparent plastic material, the disclosure is not limited thereto, and the transparent member 400 may be formed of any of various transparent materials such as a transparent glass material or a silicone material. Accordingly, the user may see an image output from the output unit 200.

The transparent member 400 may include a blue light blocking film therein. For example, the transparent member 400 may include a film that blocks blue light of a wavelength of 380 to 500 nanometers. Accordingly, the user's eye fatigue through watching the image output from the output unit 200 may be reduced.

The battery unit 500 may be detachably provided under the container unit 100. In an embodiment, the battery unit 500 may be provided under the bottom portion 110 of the container unit 100. An attachment/detachment groove recessed upward may be formed in a bottom surface of the bottom portion 110. The battery unit 500 may include an attachment/detachment protrusion inserted into the attachment/detachment groove.

In an embodiment, the attachment/detachment groove may be formed along the boundary of the bottom portion 110. Accordingly, each of the attachment/detachment groove and the attachment/detachment protrusion may be formed in a ring shape in a plan view. Alternatively, in another embodiment, the attachment/detachment groove and the attachment/detachment protrusion may be arranged along the boundary of the bottom portion 110.

The battery unit 500 may be electrically connected to the output unit 200 and may supply power to the output unit 200. Also, the battery unit 500 may be electrically connected to electronic components provided in the tumbler 10 such as the control unit 600, the communication unit 650, the sensor unit 700, and the storage unit 750 and may supply power to the electronic components.

The battery unit 500 may include a charging terminal 510 electrically connected to an external power source. The charging terminal 510 may be provided on the container unit 100. In this case, a terminal hole through which a connection terminal connected to the charging terminal passes may be formed in the output unit 200 and/or the transparent member 400 overlapping the charging terminal 510.

The battery unit 500 may include an on/off unit 530 for turning on/off power. The on/off unit may be provided on the container unit. A hole through which the on/off unit 530 passes may be formed in the output unit 200 and/or the transparent member 400 overlapping the on/off unit 530.

The temperature control unit 550 may be located between the battery unit 500 and the container unit 100. The temperature control unit 550 may be located under the container unit 100. In an embodiment, the temperature control unit 550 may be located under the bottom portion 110. The temperature control unit 550 may receive power from the battery unit 500 and may heat the container unit 100. Accordingly, the temperature control unit 550 may keep warm or heat a beverage contained in the container unit 100.

The temperature control unit 550 may cool or keep the container unit 100 cold. Accordingly, the temperature control unit 550 may cool or maintain a cool state of a beverage in the container unit 100. In an embodiment, although the temperature control unit 550 may be a Peltier device, the disclosure is not limited thereto, and the temperature control unit 550 may be any of various elements capable of heating and/or cooling.

The sensor unit 700 may be provided on the container unit 100. The sensor unit 700 may sense various information related to the tumbler 10. The sensor unit 700 may transmit sensed information to the control unit 600. Examples of the sensor unit 700 may include a temperature sensor, an illuminance sensor, a position sensor, a gyro sensor, a fingerprint recognition sensor, and a water level sensor.

The temperature sensor may measure a temperature of a beverage contained in the container unit 100. The illuminance sensor may measure an external illuminance value. The position sensor may measure a position of the tumbler 10. In an embodiment, although the position sensor may be a GPS module, the disclosure is not limited thereto. The gyro sensor may measure an angular velocity of the tumbler 10. For example, the gyro sensor may measure the shaking and movement of the tumbler 10. The water level sensor may be provided on the container unit 100. The water level sensor may measure a water level of the beverage in the container unit 100.

The fingerprint recognition sensor may be provided on the output unit 200. The fingerprint recognition sensor may obtain fingerprint information recognized by irradiating light or ultrasonic waves. In an embodiment, although examples of the fingerprint recognition sensor may include an optical recognition sensor and an ultrasonic recognition sensor, the disclosure is not limited thereto, and the fingerprint recognition sensor may include various recognition sensors.

The storage unit 750 may store data received from the communication unit 650. The storage unit 750 may store information measured by the sensor unit 700. In an embodiment, image information, temperature information, illuminance information, personal identification information, and fingerprint information may be stored in the storage unit 750.

For example, the storage unit 750 may be a voltage memory or a non-volatile memory. The storage unit 750 may be, for example, a flash memory, a ROM, a RAM, an EEROM, an EPROM, an EEPROM, a hard disk drive (HDD), or a register. The storage unit 750 may include a file system, a database, or an embedded database.

The control unit 600 may be connected to each of elements included in the tumbler 10 such as the output unit 200, the sensor unit 700, the storage unit 750, the communication unit 650, and the battery unit 500. The control unit 600 may control the output unit 200, the sensor unit 700, the storage unit 750, the communication unit 650, and the battery unit 500.

In an embodiment, the control unit 600 may be a microprocessor, but the disclosure is not limited thereto and the control unit 600 may include any of various information processing units capable of processing information such as a central processing unit (CPU).

The control unit 600 may be connected to the communication unit 650. The control unit 600 may control data received from the communication unit 650 to be stored in the storage unit 750. The control unit 600 may control the storage unit 750, the sensor unit 700, and the communication unit 650 to transmit data stored in the storage unit 750, data measured by the sensor unit 700, etc. to the user's mobile phone, a PC, a server, etc.

The control unit 600 may be connected to the output unit 200. The control unit 600 may control the output unit 200 to output an image included in image information. In an embodiment, the control unit 600 may control the output unit 200 to output one image included in image information on the output unit 200. Alternatively, in another embodiment, the control unit 600 may control the output unit 200 to simultaneously, sequentially, irregularly, or regularly output a plurality of images included in image information on the output unit 200.

The control unit 600 may control the output unit 200 to output light having a soft wavelength during sleeping. Also, the control unit 600 may control the output unit 200 or the audio unit to output soft music during sleeping. Accordingly, the user may sleep smoothly through music and light having a soft wavelength when sleeping.

Also, the control unit 600 may control the output unit 200 to output light having a soft wavelength during camping. Also, the control unit 600 may control the output unit 200 or the audio unit to output soft music during camping. Accordingly, the tumbler 10 may create a soft atmosphere during camping, thereby improving the camping atmosphere.

The control unit 600 may output information included in notification information to the user through the output unit 200. In an embodiment, the notification information may include drug taking time information, recommended daily intake information of water, vitamins, etc., schedule information, and the like.

For example, when it is time to take a drug included in the drug taking time information, the control unit 600 may control the output unit 200 to output the corresponding information visually and/or audibly. Also, the control unit 600 may control the output unit 200 to output the recommended daily intake information of water, vitamins, etc. visually and/or audibly. Also, when a schedule time included in the schedule information comes, the control unit 600 may control the output unit 200 to output the schedule information visually and/or audibly.

The control unit 600 may be connected to the sensor unit 700. The control unit 600 may control the output unit 200, the communication unit 650, the battery unit 500, etc. by using information measured by the sensor unit 700. The control unit 600 may obtain an external illuminance value measured by the illuminance sensor. The control unit 600 may adjust a brightness of the output unit 200 based on the obtained illuminance value. Accordingly, the control unit 600 may minimize power consumed by the output unit 200.

For example, the control unit 600 may match a preset illuminance value corresponding to the obtained illuminance value. The control unit 600 may adjust a brightness of the output unit 200 to correspond to the matched illuminance range. In other words, when the obtained illuminance value is low, the control unit 600 may control the output unit 200 to reduce a brightness of the output unit 200, and when the obtained illuminance value is high, the control unit 600 may control the output unit 200 to increase a brightness of the output unit 200.

The control unit 600 may obtain position information of the tumbler 10 measured by the position sensor. The control unit 600 may control the storage unit 750 and the communication unit 650 to store the obtained position information in the storage unit 750 or transmit the obtained position information to the outside through the communication unit 650. The control unit 600 may obtain an image corresponding to the position information measured by the position sensor from the storage unit 750. The control unit 600 may control the output unit 200 to output the image corresponding to the position information on the output unit 200.

For example, the control unit 600 may determine whether the position information measured by the position sensor corresponds to preset store position information. When the position information corresponds to the preset store position information, the control unit 600 may obtain an image corresponding to the store position information from the outside through the communication unit 650 or the storage unit 750. The control unit 600 may control the output unit 200 to output the image corresponding to the store position information on the output unit 200. The image may be a store promotion image or a store-related image.

The control unit 600 may obtain water level information measured by the water level sensor. The control unit 600 may control the output unit 200 to output the amount of beverage by using the obtained water level information. Accordingly, the user may visually recognize the amount of beverage in the container unit 100.

The control unit 600 may obtain temperature information measured by the temperature sensor. The control unit 600 may control the output unit 200 to output temperature information of a beverage by using the obtained temperature information. Accordingly, the user may visually recognize a current temperature of the beverage, and may be prevented from being burned by a hot beverage.

The control unit 600 may be connected to the battery unit 500. The control unit 600 may control power stored in the battery unit 500 to be supplied to the sensor unit 700, the communication unit 650, the output unit 200, and the storage unit 750. Also, the control unit 600 may control on/off of power supply of the battery unit 500. Also, the control unit 600 may control the output unit 200 to output the amount of power of the battery unit 500.

The control unit 600 may control the opening/closing member of the lid. For example, the control unit 600 may compare a temperature measured by the temperature sensor with preset temperature information and may adjust an opening degree of the beverage hole through the opening/closing member. Accordingly, when a beverage contained in the container unit 100 is hot, only a small amount may be discharged.

Figure 4:
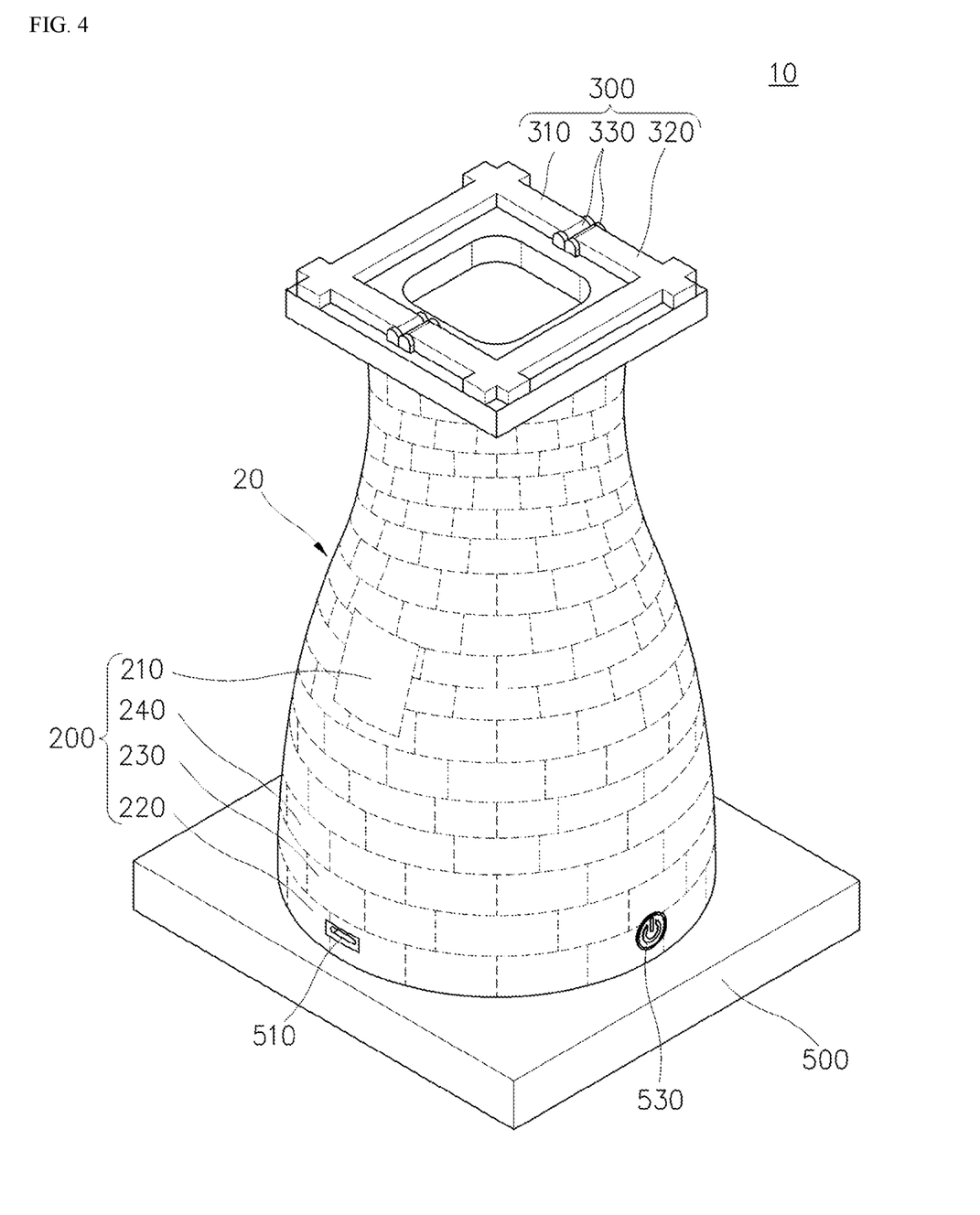
FIG. 4 is a perspective view illustrating a tumbler, according to another embodiment of the disclosure.
Figure 5:
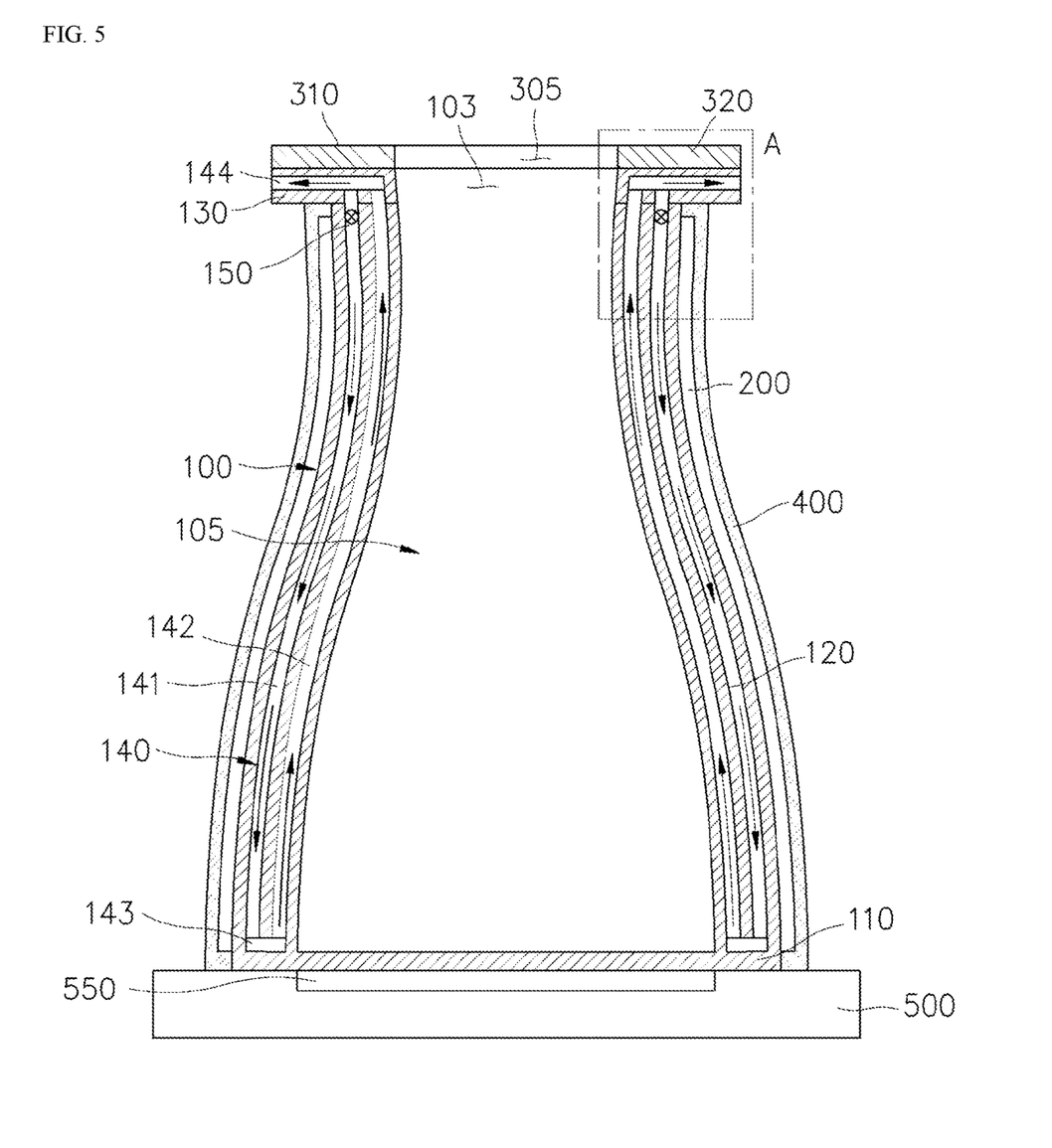
FIG. 5 is a cross-sectional view for describing the tumbler of FIG. 4.
Figure 6:
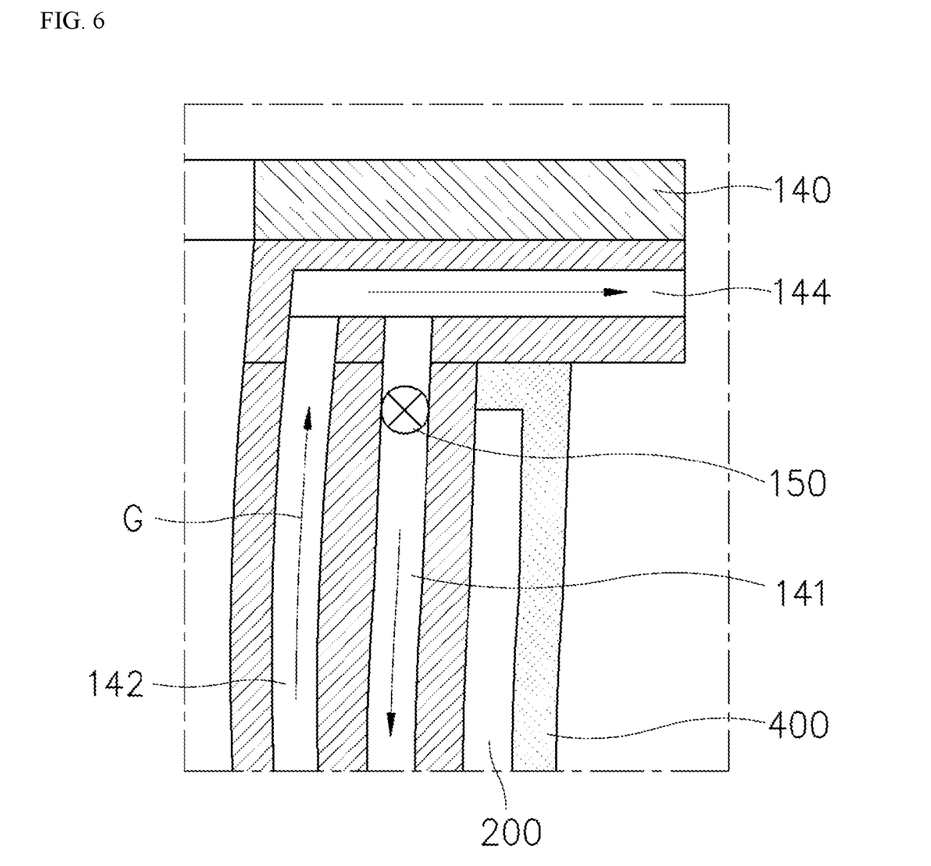
FIG. 6 is an enlarged view illustrating a portion A of FIG. 5.

FIG. 4 is a perspective view illustrating a tumbler, according to another embodiment of the disclosure. FIG. 5 is a cross-sectional view for describing the tumbler of FIG. 4. FIG. 6 is an enlarged view illustrating a portion A of FIG. 5. For the sake of brevity, the same elements as those described with reference to FIGS. 1 to 3 will not be described or will be briefly described.

Referring to FIGS. 4 to 6, the tumbler 10 may include the container unit 100, the transparent member 400, the output unit 200, the communication unit 650, and the battery unit 500. Also, the tumbler 10 may include the handle unit 300, the sensor unit 700, the temperature control unit 550, the storage unit 750, an image capturing unit (not shown), and the control unit 600.

The container unit 100 may include the bottom portion 110, the circumference portion 120, and the flange portion 130. The container unit 100 may further include a flow path unit 140 and a valve unit 150.

The flow path unit 140 may discharge heat generated in the output unit 200 to the outside. Gas such as air may be filled in the flow path unit 140. The flow path unit 140 may be located in the circumference portion 120 and the flange portion 130. In an embodiment, the flow path unit 140 may include a first flow path 141, a second flow path 142, a first connection flow path 143, and a second connection flow path 144.

The first flow path 141 may be located closer to the output unit 200 than the second flow path 142. The first flow path 141 may receive heat radiated from the output unit 200. Accordingly, air in the first flow path 141 may be heated. The second flow path 142 may be closer to the receiving space 105 of the container unit 100 than the first flow path 141.

The first connection flow path 143 and the second connection flow path 144 may connect the first flow path 141 to the second flow path 142. The first connection flow path 143 may be located closer to the battery unit 500 than the second connection flow path 144. In an embodiment, the first connection flow path 143 may connect a lower end of the first flow path 141 to a lower end of the second flow path 142. The first connection flow path 143 may be located in the circumference portion 120.

The second connection flow path 144 may be closer to the opening 103 than the first connection flow path 143. In an embodiment, the first connection flow path 143 may connect an upper end of the first flow path 141 to an upper end of the second flow path 142. The second connection flow path 144 may be located in the flange portion 130. The second connection flow path 144 may be connected to the outside of the container unit 100 and may discharge air in the flow path unit 140 to the outside.

The valve unit 150 may be located in the first flow path 141. The valve unit 150 may be located adjacent to the second connection flow path 144. The valve unit 150 may open and close the first flow path 141. Accordingly, the valve unit 150 may adjust the flow of air in the first flow path 141 toward the second connection flow path 144. In an embodiment, when the valve unit 150 closes the first flow path 141, air of the first flow path 141 heated by heat radiated from the output unit 200 may flow toward the first connection flow path 143.

The heated air flowing to the first connection flow path 143 may flow to the second flow path 142 through the first connection flow path 143. The heated air flowing through the second flow path 142 may provide heat to a beverage in the receiving space 105 of the container unit 100 while flowing through the second flow path 142. The air flowing in the second flow path 142 may flow to the second connection flow path 144. The air flowing to the second connection flow path 144 may be discharged to the outside.

When the valve unit 150 opens the first flow path 141, air of the first flow path 141 heated by heat radiated from the output unit 200 may not flow to the second flow path 142, but may directly flow to the second connection flow path 144. The air flowing to the second connection flow path 144 may be discharged to the outside through the second connection flow path 144.

In an embodiment, a plurality of flow path units 140 may be provided. The plurality of flow path units 140 may be arranged at regular intervals along the circumference of the container unit 100.

The output unit 200 may include a main display area 210 and a plurality of sub-display areas. Each of the main display area 210 and the sub-display areas may output an image. A size of each of the sub-display areas may be less than a size of the main display area 210. In the specification, a size of a display area may refer to an area.

The sub-display areas may include first to $N^{th}$ sub-display areas 220, 230, and 240. Here, N may be an integer. Sizes of the sub-display areas may be the same or different from each other.

The first sub-display areas 220 may be closer to the bottom of the container unit 100 than the second to $N^{th}$ sub-display areas. In an embodiment, the first sub-display areas 220 may be closer to the bottom portion 110 than the second to $N^{th}$ sub-display areas. The first sub-display areas 220 may be arranged along the circumference of the container unit 100.

The second sub-display areas 230 may be located over the first sub-display areas 220. Each of the second sub-display areas 230 may be located over the first sub-display areas 220 adjacent to each other. The second sub-display areas 230 may be arranged along the circumference of the container unit 100.

The third sub-display areas 240 may be located over the second sub-display areas 230. Each of the third sub-display areas 240 may be located over the second sub-display areas 230 adjacent to each other. The third sub-display areas 240 may be arranged along the circumference of the container unit 100.

The second to $N^{th}$ sub-display areas may be sequentially arranged upward from the first sub-display areas 220. Also, the first to $N^{th}$ sub-display areas may be arranged upward in a zigzag shape.

The main display area 210 may be located between the top and the bottom of the container unit 100. A size of the main display area 210 may be greater than a size of each of the sub-display areas. In an embodiment, the main display area 210 may be located in a middle portion of the container unit 100.

The image capturing unit may be provided on the container unit 100. In an embodiment, the image capturing unit may be provided on the flange portion 130. The image capturing unit may capture an image around the tumbler 10 and may obtain image information. The image capturing unit may transmit the obtained image information to the control unit 600 or may store the obtained image information in the storage unit 750. The control unit 600 may control the valve unit 150. In an embodiment, the control unit 600 may control the valve unit 150 to maintain the first flow path 141 in an open state in a general situation. However, when the temperature control unit 550 heats the container unit 100, the control unit 600 may control the valve unit 150 to close the first flow path 141. Accordingly, the control unit 600 may assist heat radiated from the output unit 200 to heat a beverage of the container unit 100.

The control unit 600 may control the output unit 200. In an embodiment, the control unit 600 may control each of the plurality of display areas. For example, the control unit 600 may control each of the display areas to output a part of the same image according to a position of each display area, thereby outputting one image as a whole.

Also, the control unit 600 may control the main display area 210 to output an advertising image, some of the sub-display areas to output an identification code image, and the remaining sub-display areas to output an entertainment image.

Also, the control unit 600 may control an image of a company to be output on the main display area 210. Also, the control unit 600 may control the output unit 200 to output a company brand name and other images (e.g., a public service advertisement image and other company images) on the sub-display areas.

Also, the control unit 600 may obtain delivery information received from the communication unit 650. The delivery information may include information about a delivery order date/time, delivery order location, delivery order product, etc. The control unit 600 may control the output unit 200 to output the delivery information. Also, the control unit 600 may change the delivery information output on the main display area 210 according to a delivery step.

For example, the control unit 600 may control the output unit 200 to output information about a delivery order date/time on the main display area 210, and may control the output unit 200 to output information about a delivery order location, delivery order product, etc. on the sub-display areas. Also, when information indicating that the user approves a delivery order is obtained through the communication unit 650, the control unit 600 may control the output unit 200 to output information about a delivery order product on the main display area 210. Also, when information indicating that the user obtains a delivery product is received through the communication unit 650, the control unit 600 may control the output unit 200 to output information about a delivery location on the main display area 210.

The control unit 600 may control the communication unit 650 to transmit image information captured by the image capturing unit to the outside.

Although the tumbler 10 according to various embodiments of FIGS. 1 to 6 has been described, one or more embodiments may be combined with each other. For example, the tumbler 10 of FIG. 1 and the tumbler 10 of FIG. 4 may be combined with each other to form a new embodiment.

Although the embodiments of the disclosure have been illustrated and described above, the disclosure is not limited to the above-described specific embodiments. Various modified embodiments may be made by one of ordinary skill in the art without departing from the scope of the disclosure as claimed in the claims, and these modifications should not be individually understood from the technical spirit or the prospect of the disclosure.

The invention claimed is:

1. A tumbler capable of outputting images comprising:
a container unit comprising an opening at a top and a receiving space therein in which a beverage is contained;
a communication unit provided on the container unit and configured to receive image information from outside;
a transparent member provided on the container unit to surround a circumference of the container unit, the transparent member being formed of a transparent material through which light is transmitted;
an output unit located between the transparent member and the container unit and provided on the container unit to surround the circumference of the container unit, the output unit being configured to output at least one image included in the image information; and
a battery unit detachably provided under the container unit and configured to supply power to the output unit,
wherein the output unit comprises:
a plurality of first sub-display areas located adjacent to a bottom of the container unit and configured to output images;
a plurality of second sub-display areas located over the plurality of first sub-display areas and configured to output images; and
a main display area located between the top and the bottom of the container unit, and
wherein the plurality of first sub-display areas and the plurality of second sub-display areas are each arranged along the circumference of the container unit, and a size of the main display area is greater than a size of each of the plurality of first sub-display areas and a size of each of the plurality of second sub-display areas.

2. The tumbler capable of outputting images of claim 1, wherein the output unit is configured to output an audio corresponding to audio information received through the communication unit.

3. The tumbler capable of outputting images of claim 1, wherein each of the plurality of second sub-display areas is located between adjacent first sub-display areas.

4. The tumbler capable of outputting images of claim 1, wherein the image information comprises an advertising image, an identification code image, and an entertainment image.

5. The tumbler capable of outputting images of claim 1, further comprising a temperature control unit located between the container unit and the battery unit to be provided under the container unit, the temperature control unit being configured to receive power from the battery unit and heat the container unit.

6. The tumbler capable of outputting images of claim 1, further comprising a control unit configured to control the output unit to output at least one image included in the image information.

7. The tumbler capable of outputting images of claim 1, wherein the container unit comprises: a bottom portion forming the bottom of the container unit; a circumference portion extending from a boundary of the bottom portion toward the opening; and a flange portion extending outward from an upper end of the circumference portion.

8. A tumbler capable of outputting images comprising:
a container unit comprising an opening at a top and a receiving space therein in which a beverage is contained;
a communication unit provided on the container unit and configured to receive image information from outside;
a transparent member provided on the container unit to surround a circumference of the container unit, the transparent member being formed of a transparent material through which light is transmitted;
an output unit located between the transparent member and the container unit and provided on the container unit to surround the circumference of the container unit, the output unit being configured to output at least one image included in the image information; and
a battery unit detachably provided under the container unit and configured to supply power to the output unit,
wherein the container unit comprises:
a bottom portion forming a bottom of the container unit;
a circumference portion extending from a boundary of the bottom portion toward the opening;
a flange portion extending outward from an upper end of the circumference portion; and
a handle unit provided on the top of the container unit and allowing a user to hold the tumbler by hand,
wherein the handle unit comprises:
a hinge portion provided on the flange portion;
a first handle member having one end pivotably provided on the hinge portion; and
a second handle member having one end pivotably provided on the hinge portion and located symmetrical to the first handle member with respect to the hinge portion, and wherein each of the first handle member and the second handle member is formed in a "⊏" shape in a plan view.

\* \* \* \* \*